United States Patent Office 3,285,745
Patented Nov. 15, 1966

3,285,745
LAMINATED PLANOGRAPHIC PRINTING PLATES
Julius L. Silver, Somerset, and Victor Auerbach, North Plainfield, N.J., assignors to Union Carbide Corporation, a corporation of New York
No Drawing. Filed July 1, 1963, Ser. No. 292,141
9 Claims. (Cl. 96—90)

The present invention relates to an improved printing plate surfaced with a photosensitive composition of a phenolic resin and an ethylene oxide polymer.

In accordance with the present invention an improved phenolic resin/ethylene oxide polymer association product surfaced printing plate base has now been made by joining a phenolic resin/ethylene oxide polymer film to a substrate of polyhydroxyether. These laminated printing plate bases exhibit exceptional integrity and possess excellent resistance to delamination.

The term "polyhydroxy ether" herein refers to polymers having the general formula:

$$\{O-D-O-E\}_n$$

wherein D is the radical residuum of a dihydric phenol, E is a hydroxyl containing radical residuum such as can be derived from an epoxide, and $n$ represents the degree of polymerization and is at least 30 and is preferably 80 or more. The term "polyhydroxyether" is also intended to include mixtures of at least two polyhydroxy ethers.

The dihydric phenol contributing the radical residuum, D, can be either a dihydric mononuclear phenol such as hydroquinone and resorcinol or a dihydric polynuclear phenol such as those having the general formula:

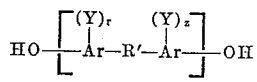

wherein Ar is an aromatic divalent hydrocarbon group such as naphthalene, and preferably, phenylene, the various Y groups which can be the same or different are substituents such as alkyl radicals, preferably having from 1 to 4 carbon atoms, halogen radicals, i.e. fluorine, chlorine, bromine, and iodine, or alkoxy radicals, preferably having from 1 to 4 carbon atoms, $r$ and $z$ are digits having a value of from 0 to a maximum value corresponding to the number of hydrogen atoms on the respective aromatic radicals (Ar) which can be replaced by substituents, and R' is a bond between adjacent carbon atoms as in dihydroxy diphenyl or is a divalent radical such as a functional divalent radical, for example, carbonyl, oxy, thio, sulfinyl, sulfonyl, dithio; or a divalent hydrocarbon radical, such as alkanediyl, cycloalkanediyl, arylene and the like, and said hydrocarbon radicals can be substituted by substitutents non-reactive under the reaction conditions, such as halo, alkoxy, polysiloxy, aryloxy and the like; or a more complex divalent radical containing two or more of the foregoing and/or other simpler types of divalent radicals.

The dihydric phenols are well-known in the art. Illustrative of the dihydric polynuclear phenols are bis(hydroxyphenyl)methane, bis(hydroxyphenyl)ethane, bis(hydroxyphenyl)propane, 1,3-bis(p-hydroxyphenyl)-1-ethyl cyclohexane, bis(hydroxyphenyl)sulfone, 1,2-bis(p-hydroxyphenyl)-1-methyl-4-isopropylcyclohexane, bis-(hydroxyphenyl)cyclohexane, 2-(p-hydroxyphenyl)-2-[4-methyl-4-(p-hydroxyphenyl)cyclohexyl]propane, 2-(p-hydroxyphenyl) -2- [4 - methyl - 3(p - hydroxyphenyl)cyclohexyl]propane and the like.

The epoxide which can be regarded as the precursor of the hydroxyl containing radical residuum, E, can be a monoepoxide or diepoxide. By epoxide is meant a compound containing an oxirane group, i.e., oxygen bonded to two vicinal carbon atoms, thus

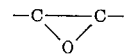

A monoepoxide contains one such oxirane group and provides a radiacal residuum E containing a single hydroxyl group; a diepoxide contains two such oxirane groups and provides a radical residuum containing two hydroxyl groups.

Illustrative of the epoxides are the epihalohydrins such as epichlorohydrin, epibromohydrin and the like; epoxycycloalkyl ethers such as bis(2,3-epoxycyclopentyl) ether and the like, diglycidyl compounds such as diglycidyl phthalate, diglycidyl ether and the like, and diepoxy alkanes, such as butadiene dioxide and the like. The epoxides are also well known in the art.

A single monoepoxide or diepoxide or a mixture of at least two monoepoxides or diepoxides or both can be employed in preparing polyhydroxy ethers and the term epoxide is intended to include such mixtures.

Illustrative of a typical polyhydroxy ether is:

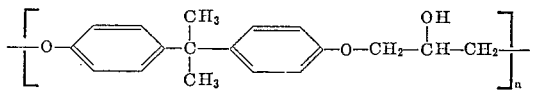

The term "phenolic resin/ethylene oxide polymer" association product as used herein refers to compositions generally comprising:
(1) A normally solid ethylene oxide polymer, and
(2) A phenolic resin.
"Ethylene oxide polymer" as used herein refers to polymers containing the repeating unit $$-(CH_2-CH_2-O-)$$

and is intended to include soluble polymers containing ethylene oxide as the predominant monomer polymerized therein but which can also contain polymerized residues of other olefin oxides such as copolymers and terpolymers of ethylene oxide with other epoxide monomers, such as propylene oxide, butylene oxide, styrene oxide and the like.

As indicated above the ethylene oxide polymers are normally solid materials. The normally solid ethylene oxide polymers of these compositions possess an average molecular weight of at least 30,000. It is preferred however to use ethylene oxide polymers having average molecular weights of from 50,000 to 10,000,000 because these polymers produce plate surfaces exhibiting improved toughness.

The phenolic resin component of the composition used above refers to the phenol aldehyde condensation products known generally as phenolic resins. These resins include the resole phenolic resins and the novolak phenolic resins, the properties and preparation of which are well known in the art. An excellent discussion of the preparation and properties of the phenolic resins appears in "High Polymers—Phenoplasts" by T. S. Carswell (1947), Interscience Publishers Inc., New York, which is hereby incorporated by reference.

The laminated printing plate bases of the present invention are prepared by laminating the phenolic resin/ ethylene oxide polymer association product printing surface to a substrate of polyhydroxyether, generally under heat and pressure. This lamination can be effected utilizing any one of several techniques. For example, a lamina of phenolic resin/ethylene oxide polymer association product is held in intimate contact with a lamina of polyhydroxyether. The lamina are subjected to a pressure of from 150 to 260 pounds per square inch, and the laminae temperature is raised to from about 170° C. to about 200° C. The pressure and temperature are maintained for a period of from 5 to 15 minutes to effect lamination and cure of the phenolic resin/ethylene oxide polymer. If the phenolic resin/ethylene oxide polymer lamina is precured a laminating period of from 0.5 to 2 minutes is sufficient. Lamination can also be accomplished by extrusion coating. This technique consists in extruding a film or sheet of molten polyhydroxyether continuously through a slot die onto a lamina of phenolic resin/ethylene oxide polymer. Lamination is effected by the heat of the polyhydroxyether extrudate. Other methods of effecting thermal lamination are known to the art and can also be used.

The printing plate bases of the present invention are photosensitized before use. This can be accomplished effectively by either incorporating a photosensitizing agent in the phenolic resin/ethylene oxide polymer composition prior to the manufacture of the phenolic resin/ethylene oxide resin lamina or by applying the photosensitizing agent directly to the surface of the phenolic resin/ethylene oxide polymer lamina prior to use.

Photosensitizing agents which are used in the photosensitization of the printing plate bases are those which when acted upon by light energy at ambient temperatures become capable of reaction with the phenolic resin component thereby causing a decline in hydrophilicity of the resin. These sensitizers may also enter into reaction with the ethylene oxide polymer component causing degradation of these units. Generally those printing plate sensitizers known to the art will sensitize the printing plate bases of this invention. Illustrative of suitable sensitizers are compounds which release halogens under the action of light energy, such as hydrogen halides, halogenated aliphatic hydrocarbons containing from 1 to 10 carbon atoms inclusive and the like; light sensitive inorganic compounds such as ammonium dichromate and other water soluble hexavalent chromium compounds, light sensitive diazo and diazonium compounds and the like.

Preferred photosensitizers are the alkyl and alkylene halides such as iodoform, bromoform, chloroform, tetra-iodido ethane, ethylene bromide and the like.

Generally, the quantity of ethylene oxide polymer in the compositions can vary between about 0.05 and 3 parts by weight per part of phenolic resins, with the preferred ratio being between about 0.6 to 1.8 parts of ethylene oxide polymer per part of phenolic resin. The quantity of photosensitizing substance in the compositions can vary between about 0.0008 and 0.2 part by weight per part of phenolic resin. This amount however varies with application. If the sensitizer is coated on the plate, very little sensitizer is used, if incorporated, a greater amount is used. The ratio of these components varies depending on the particular characteristics of the respective components, the presence or absence of fillers and other similar materials, and the particular combination of properties sought in the compositions.

The phenolic resin/ethylene oxide polymer can be applied as a solution coating on polyhydroxyether in the preparation of a planographic printing plate by dissolving the components in a suitable solvent and admixing them or by dissolving the mixed composition in a suitable solvent. Illustrative of solvents suitable for the preparation of the solutions are acetone, methyl ethyl ketone, and the like, and mixtures thereof. The preferred solvent when coating onto polyhydroxyether film is acetone and water in ratios of 1:1 to 4:1. Many other solvents attack the substrate chemically.

In the laminates for use as printing plates, the phenolic resin/ethylene oxide polymer film sheet or coating generally has a thickness of from about ½ to about 10 mils and preferably of from 2 to 4 mils. This lesser thickness is preferred as the thinner films are more economical and because thicker films may cause excessive swelling of the plate when wetted with water during lithographic printing.

It is to be understood that variations can be made in the laminates. Fillers such as clays, dusts and flours may be added to the phenolic resin/ethylene oxide polymer blends prior to forming sheets or films to lower costs or for any other reason. Re-enforcing additives such as asbestos, fiber glass or other natural or synthetic fibers can be used by either incorporating them in the polyhydroxy ether resin films or as additional laminae, laminating them to the laminate as mats or textile. Acid or basic compounds can be added to reduce tack in the phenolic resin.

The polyhydroxyether side of the laminate of this invention can be additionally laminated to another surface such as wood, metal, paper, plastic or other substrate by heating the polyhydroxyether to flowing temperature and affixing with pressure or by merely laying the polyhydroxyether surface on a substrate sufficiently heated to effect bonding.

After the laminated has been formed, the printing plate surface can be coated with a solution of photosensitizer if the photosensitizer was not previously incorporated into the composition.

The photosensitizer component can be applied to the phenolic resin/ethylene oxide polymer surface as a solution in a hydroxylic solvent such as water or in alcohol or any other convenient solvent. The photosensitizer solution may be applied by pouring, spreading, dipping, rolling, whirl-coating, wiping on or spraying or in any other conventional manner.

The photosensitizer coating can be applied in multiple layers, with each layer being dried before the next one is applied, so as to produce an overall coating of any desired thickness. It is one of the advantages of the present invention, however, that excellent planographic plates can be produced with the application of a single-layer coating of photosensitizer.

The photosensitized plastic plate is exposed to light source rich in ultra-violet through a transparent pattern (e.g., a negative) to form an image on the photosensitive surface. The light source can be sunlight, carbon-arc light, mercury vapor light and other light sources customarily employed in the production of lithographic plates.

It is believed that the phenolic resin/ethylene oxide polymer composition is itself bound by the "association" or "complex" formation between the phenolic resin component and the ethylene oxide polymer component. The term "association" refers to the interaction which provides the binding force between the ethylene oxide polymer component and the phenolic resin component. It is believed that the interaction involves one or more diverse mechanisms such as hydrogen bonding, electrostatic bonding, secondary valence forces, and the like. It appears that the phenomenon concerning hydrogen bonding can best explain the nature of the interaction. The "associating" or "complexing" interaction between the phenolic resin component and the ethylene oxide polymer component in the photosensitive compositions might be visualized in the following manner:

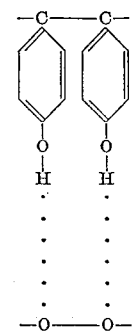

The "association" of the resin component and the ethylene oxide polymer component causes the formation of a tough, hydrophilic material. The water-receptivity of this "association" product declines as the phenolic resin "advances," that is, increases in molecular weight and/or in degree of cross-linking on exposure to light. Radicals released by the action of light on the photosensitizer on the surface of the plastic-base material react with the phenolic resin to produce intermediate chemical products. These products presumably react with each other as well as the unactivated phenolic derivatives with the result of advancing the resin and/or diminishing methylol and methylene ether group content. This causes the water-receptivity of the phenolic/(ethylene oxide) polymer plate to decline in proportion to the radicals produced, which is in turn proportional to the intensity of the light received by a particular portion of the coating during exposure.

It is also believed that the hydroxyl group in the polyhydroxyether is sufficiently polar to cause the material to enter into extensive hydrogen bonding or other type of electrostatic or associative bonding with the phenolic/ethylene oxide polymer to create a permanent and durably bonded structure.

The above-postulated mechanisms of interaction are merely theoretical and should not be construed as limiting this invention. Other theories or reasons may equally well explain the nature of the various interactions.

The phenolic resin/ethylene oxide polymer-polyhydroxyether laminate base provides distinct advantages over prior art printing plates. The laminate which is normally clear, when prepared without additives or filler, enables the pressman to use permanent bench marks on the plates which can be used to align plates in the press with other marks on the press which are normally hidden by the plate, thus facilitating remounting. In addition, when a heavily re-enforced plate is desired the pressman may bond the laminate onto a clean aluminum sheet or other suitable back merely by heating the aluminum or other surface to a temperature of about 250–700° F. and placing the polyhydroxyether portion of the plate on the heated surface. These advantages increase the versatility of these plates beyond any type of plate known to the art. It provides the pressman with a plate which can be used presensitized if desired, or unsensitized if a special sensitizing coating is preferred; it enables the pressman to use a thin, flexible, light weight plate or permits him to use a heavy backing if a stiff, inflexible plate is desired with very little effort or equipment.

The thermoplastic polyhydroxyether used in the succeeding examples was prepared as follows:

There was placed in a flask:

| | Parts |
|---|---|
| 2,2-bis(4-hydroxyphenyl)propane | 114.15 |
| Epichlorohydrin (99.1% pure) | 46.8 |
| Ethanol | 96.0 |
| Butanol | 10.0 |
| Sodium hydroxide (97.5% pure) | 22.6 |
| Water | 70.0 |

The above mixture was stirred at room temperature for sixteen hours to accomplish the initial coupling reaction. The mixture was then heated at 80° C. for an hour. Thereupon, approximately sixty-five parts of a 7:3 mixture of toluene: butanol was added to the flask. Heating of the mixture at 80° C. was continued another two hours. There was added to the flask an additional fifty five parts of the 7:3 toluene: butanol mixture and 4.5 parts of phenol. The contents of the flask were heated to a temperature of 80° C. (reflux) which temperature was maintained for a period of two hours and then allowed to cool. Total reaction time at 80° C. was five hours. Upon cooling the reaction mixture was cut with about two hundred and twenty parts of the 7:3 toluene: butanol mixture. One hundred parts of water was added to the flask and agitated with the contents to dissolve salts present in the reaction mixture. The flask contents were allowed to settle for 1 hour during which time a lower brine phase formed. This lower phase was separated by decantation. The upper polymer solution containing phase was washed successively with 2, one hundred and sixty-part portions of water containing 4.5 percent butanol acidified to pH of about 2–3 with dilute (i.e. ca., 5%) $H_3PO_4$, and water washed until the washings were essentially neutral, i.e. pH about 6. The washed polymer was then coagulated in isopropanol, filtered and dried. Reduced viscosity was above 0.5, measured at 25° C. as a 0.2 gram sample in 100 milliliters of tetrahydrofuran.

(a) Preparation of the phenolic resin:

To a conventional vacuum reflux condensing apparatus were charged 150 parts by weight of a 37 percent aqueous solution of formaldehyde, 100 parts by weight of phenol and 3 parts by weight sodium hydroxide. This mixture was then refluxed for a period of 90 minutes at a reduced pressure 559 millimeters of mercury. Upon completion of this reflux period 1.3 parts by weight of boric acid were added to the refluxed mixture as an aqueous slurry in water. This mixture was then thoroughly agitated and water was removed by distillation at a reduced pressure of 660 millimeters of mercury until the distillation temperature reached 95° C. The resin was discharged from the still, allowed to cool to a bulk mass, and was then pulverized to a fine powder.

(b) Illustrative preparation of a phenolic/ethylene oxide polymer printing surface film:

The following ingredients were charged to a mixing container:

| Ingredient: | Amount parts by weight, grams |
|---|---|
| Powdered poly(ethylene oxide) having a molecular weight range of from about 3,000,000 to 4,000,000 | 900 |
| Powdered phenolic resin (as prepared in Example (a) above) | 600 |
| Powdered sodium stearate (commercial grade) | 90 |

These ingredients were dry blended by mixing thoroughly and 235 grams of water were added. The mixture was then blended into a paste by further mixing.

This paste was then charged to a Banbury blender having heated rotors set at 100° C. The paste was worked in the blender until the paste reached a temperature of about 130° C. This blending operation required about 5 minutes time. The heated paste was then charged to a two roll mill having a roll temperature of about 130° C. and was repeatedly milled until the paste material became non-rubbery in nature and began to sheet well. The material was then transferred to a 4 roll "L" type calender in which the rolls have a progressively lower temperature from the first roll having a temperature of 150° C. (second roller at 140° C. and so on). The calender produced a continuous roll of film having a thickness of from 2 to 4 mils.

EXAMPLE 1

A two-mil film of the printing plate surface composition, prepared as described above, was laid on a 5 mil extruded film of polyhydroxyether prepared as described above. Those films were then placed between two smooth surfaced chrome plated steel platens in a hydraulic press. The plates were pre-heated to a temperature of about 190° C. and a pressure of about 300 pounds per square inch was applied to the sandwich. This temperature and pressure were applied for about five minutes. At the end of this period the platens were cooled and the laminated printing plate thus formed was removed. This plate was approximately 30 inches by 24 inches in size.

The plate was coated with a solution of 5 percent iodoform in acetone and dried. A half-tone negative was then placed on the coated plate and the whole was exposed to a radiation from a 15 ampere carbon arc lamp at 24 inches for a period of 5 minutes. This plate was then trimmed to size and mounted on an offset printing press. A "quick-set" lithographic type printing ink was charged to the press and approximately 5000 prints were made on 20 lb. bond paper. These prints were excellent in all aspects and there was no evidence of plate stretch or mechanical deficiency during the printing run.

EXAMPLE 2

In a manner identical with that described in Example 1 above a laminated printing plate of polyhydroxyether and phenolic resin/poly(ethylene oxide) film was prepared and trimmed. Likewise, laminates were also prepared of the phenolic resin/poly(ethylene oxide) printing surface film with each of the following base films:

Polyethylene
Polystryene
Polyvinyl chloride

These latter plates were also trimmed, and all plates were cut in half. One half of each plate was held in storage at room temperature, the other half of each plate was immediately immersed in water, and held there until the plate material wetted thoroughly (approximately 15 minutes). The following results were observed in each test.

*Storage test*

| Base material: | Result |
|---|---|
| Polyhydroxyether | No delamination. |
| Polyethylene | Plate delaminated. |
| Polystyrene | Do. |
| Polyvinyl chloride | Do. |

Example 2 was repeated utilizing solution coated substrates. The results obtained were substantially the same.

What is claimed is:

1. A laminate comprising a first layer containing in intimate mixture a phenolic resin and a normally solid ethylene oxide resin having a molecular weight of at least 30,000 and a second layer comprising a thermoplastic polyhydroxyether resin.

2. The laminate of claim 1 wherein the phenolic resin ethylene oxide polymer lamina contains a photosensitizing agent.

3. A laminated planographic printing plate base comprising a lamina of a product containing in intimate mixture a phenolic resin and a normally solid (ethylene oxide) polymer having a molecular weight of at least 30,000 and a lamina comprising a polyhydroxy ether resin of the formula:

$$\mathrm{+O\!-\!D\!-\!O\!-\!E\!+_n}$$

wherein D is the radical residuum of a dihydric phenol, E is a hydroxyl containing radical residuum of an epoxide, and $n$ is an integer having a value of at least 30.

4. The laminated planographic printing plate base of claim 3 wherein D is the radical residuum of 2,2-bis(p-hydroxyphenyl)propane.

5. The laminated planographic printing plate base of claim 3 wherein D is the radical residuum of 1,3-bis(p-hydroxyphenyl)-1-ethylcyclohexane.

6. The laminated planographic printing plate base of claim 3 wherein D is the radical residuum of 1,2,-bis(p-hydroxyphenyl)-1-methyl-4-isopropylcyclohexane.

7. The laminated planographic printing plate base of claim 3 wherein D is the radical residuum of 2-(p-hydroxyphenyl)-2-[4-methyl-3-(p - hydroxyphenyl)cyclohexyl] propane.

8. The laminated planographic printing plate base of claim 3 wherein D is the radical residuum of 2-(p-hydroxyphenyl)-2-[4-methyl-4-(p - hydroxyphenyl)cyclohexyl] propane.

9. The laminated planographic printing plate base of claim 3 wherein D is the radical residuum of a bis(hydroxyphenyl) sulfone.

References Cited by the Examiner

UNITED STATES PATENTS

| 2,474,700 | 6/1949 | Slifkin | 96—75 |
|---|---|---|---|
| 2,786,794 | 3/1957 | Gams et al. | 161—186 |
| 2,971,842 | 2/1961 | Moore et al. | 10: -149.2 X |
| 3,006,761 | 10/1961 | Reichel et al. | 96—75 |
| 3,007,828 | 11/1961 | Boyer et al. | 161—184 |
| 3,051,597 | 8/1962 | Bushong et al. | 161—184 |
| 3,177,089 | 4/1965 | Marshall et al. | 117—72 |
| 3,220,348 | 11/1965 | Royer | 101—395 |

EARL M. BERGERT, *Primary Examiner.*

NORMAN S. TORCHIN, HAROLD ANSHER,

R. L. STONE, *Assistant Examiners.*